US009198119B2

(12) United States Patent
Venkatraman et al.

(10) Patent No.: US 9,198,119 B2
(45) Date of Patent: Nov. 24, 2015

(54) METHOD AND APPARATUS FOR PEER-2-PEER WI-FI RANGING USING NEAR FIELD COMMUNICATION

(71) Applicant: QUALCOMM Incorporated, San Diego, CA (US)

(72) Inventors: Sai Pradeep Venkatraman, Santa Clara, CA (US); Weihua Gao, San Jose, CA (US); Vinay Sridhara, Santa Clara, CA (US); Sina Firouzabadi, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 64 days.

(21) Appl. No.: 13/785,876

(22) Filed: Mar. 5, 2013

(65) Prior Publication Data
US 2014/0254575 A1 Sep. 11, 2014

(51) Int. Cl.
*H04W 84/12* (2009.01)
*H04W 84/18* (2009.01)
*H04W 80/04* (2009.01)
*H04W 8/26* (2009.01)
*H04W 88/06* (2009.01)
*H04W 48/16* (2009.01)
*H04W 8/00* (2009.01)
*H04W 4/00* (2009.01)

(52) U.S. Cl.
CPC .............. *H04W 48/16* (2013.01); *H04W 8/005* (2013.01)

(58) Field of Classification Search
CPC ..... H04W 84/12; H04W 84/18; H04W 80/04; H04W 8/26; H04W 88/06
USPC ................................ 370/338, 311; 455/41.2
See application file for complete search history.

(56) References Cited

U.S. PATENT DOCUMENTS

| 7,873,848 | B2 * | 1/2011 | Nakahara et al. ............. 713/320 |
| 7,974,236 | B2 | 7/2011 | Woo |
| 8,224,246 | B2 | 7/2012 | Suumaeki et al. |
| 8,271,662 | B1 * | 9/2012 | Gossweiler et al. .......... 709/227 |
| 8,670,714 | B2 * | 3/2014 | Marcovecchio et al. ..... 455/41.2 |
| 8,769,643 | B1 * | 7/2014 | Ben Ayed ........................ 726/5 |
| 2009/0111378 | A1 * | 4/2009 | Sheynman et al. .......... 455/41.1 |

(Continued)

FOREIGN PATENT DOCUMENTS

WO    WO 2013025512 A1 *    2/2013    ............ H04W 84/12

OTHER PUBLICATIONS

Al-Ofeishat H.A., et al., "Near Field Communication (NFC)," IJCSNS International Journal of Computer Science and Network Security, Feb. 2012, vol. 12 (2), pp. 93-99.

(Continued)

*Primary Examiner* — Mark Rinehart
*Assistant Examiner* — Sanjay K Dewan
(74) *Attorney, Agent, or Firm* — Kilpatrick Townsend Stockton LLP (57) ABSTRACT

According to some aspects, a method includes communicating a request from a first device to a second device using near field communication (NFC). The request includes a preferred mode of wireless local area network (Wi-Fi) operation and state information of the first device. The method further includes receiving a reply at the first device, sent from the second device, including acceptance of the preferred mode of Wi-Fi operation. The method further includes communicating wireless information to establish the Wi-Fi communication link from the first device to the second device.

28 Claims, 8 Drawing Sheets

(56) References Cited

U.S. PATENT DOCUMENTS

| | | |
|---|---|---|
| 2009/0227282 A1 | 9/2009 | Miyabayash et al. |
| 2010/0081385 A1 | 4/2010 | Lin et al. |
| 2012/0076117 A1* | 3/2012 | Montemurro et al. ........ 370/338 |
| 2012/0099566 A1* | 4/2012 | Laine et al. .................. 370/338 |
| 2012/0265913 A1* | 10/2012 | Suumaki et al. .............. 710/303 |
| 2012/0290731 A1* | 11/2012 | Suumaki et al. .............. 709/228 |
| 2012/0322368 A1* | 12/2012 | Desai et al. .................. 455/41.1 |
| 2013/0188628 A1* | 7/2013 | Lee et al. ...................... 370/338 |
| 2013/0301497 A1* | 11/2013 | Gonikberg et al. ........... 370/311 |
| 2013/0304815 A1* | 11/2013 | Puente et al. ................. 709/204 |
| 2014/0004793 A1* | 1/2014 | Bandyopadhyay et al. . 455/41.1 |
| 2014/0177615 A1* | 6/2014 | Kim et al. ..................... 370/338 |

OTHER PUBLICATIONS

Blumenthal, J., et al., "Precise Positioning with a Low Complexity Algorithm in Ad hoc Wireless Sensor Networks", PIK. Praxis Der Informationsverarbeitung Uno Kommunikation, Saur, Muenchen, DE, vol. 28, No. 2 Jun. 1, 2005, pp. 80-85, XP002495976, ISSN: 0930-5157, 001: 10.1515/PIK0.2005.80, Retrieved from the Internet: URL:http://rtl.e-technik-uni-rostock.de/%20frei/geosens/dateien/B RT05. pdf.

International Search Report and Written Opinion—PCT/US2014/018665—ISA/EPO—Jun. 5, 2014.

* cited by examiner

METHOD AND APPARATUS FOR PEER-2-PEER WI-FI RANGING USING NEAR FIELD COMMUNICATION

BACKGROUND

Wireless local area networks (Wi-Fi) often use ranging for measuring locations and distances between a station or mobile device (STAs) and an access point. Typically the discovery process is fairly simple and straightforward, since the access points within the wireless local area network transmit a periodic beacon packet. The stations or mobile devices that wish to communicate on the network listen on all the available channels in order to discover all of the access points within a given network geospace. However, in peer-to-peer (P2P) ranging, the discovery process becomes more difficult with the STAs being mobile, hopping in the frequency spectrum, and the potential for STAs to be in sleep mode. It may be desirable to create techniques or systems that improve on any or all of these characteristics.

SUMMARY

These problems and others may be solved according to various embodiments, described herein. Systems, methods, apparatuses, and computer-controlled media are provided for peer-to-peer Wi-Fi ranging using near field communication (NFC).

In some embodiments, the method includes communicating, from a first device to a second device using near field communication (NFC), a request comprising a preferred mode of wireless local area network (Wi-Fi) operation and first device state information. The method may further include receiving, at the first device from the second device, a reply comprising acceptance of the preferred mode of Wi-Fi operation. The method may further include communicating, from the first device to the second device, wireless information to establish a Wi-Fi communication link.

In some embodiments, an apparatus includes a processor coupled to a transceiver. The transceiver is configured to communicate from a first device to a second device using near field communication (NFC), a request comprising a preferred mode of wireless local area network (Wi-Fi) operation and first device state information. The transceiver is further configured to receive at the first device from the second device, a reply comprising acceptance of the preferred mode of Wi-Fi operation. The transceiver is further configured to communicate, from the first device to the second device, wireless information to establish a Wi-Fi communication link.

In some embodiments, an apparatus includes means for communicating, from a first device to a second device using near field communication (NFC), a request comprising a preferred mode of wireless local area network (Wi-Fi) operation and first device state information. The apparatus may further include means for receiving, at the first device from the second device, a reply comprising acceptance of the preferred mode of Wi-Fi operation. The apparatus may further include means for communicating, from the first device to the second device, wireless information to establish a Wi-Fi communication link.

In some embodiments, a computer program product residing on a processor-readable medium and including processor-readable instructions is configured to communicate, from a first device to a second device using near field communication (NFC), a request comprising a preferred mode of wireless local area network (Wi-Fi) operation and first device state information. The instructions may further cause the processor to receive, at the first device from the second device, a reply comprising acceptance of the preferred mode of Wi-Fi operation. The instructions may further cause the processor to communicate, from the first device to the second device, wireless information to establish a Wi-Fi communication link.

The foregoing has outlined rather broadly features and technical advantages of examples in order that the detailed description that follows can be better understood. Additional features and advantages will be described hereinafter. The conception and specific examples disclosed can be readily utilized as a basis for modifying or designing other structures for carrying out the same purposes of the present disclosure. Such equivalent constructions do not depart from the spirit and scope of the appended claims. Features which are believed to be characteristic of the concepts disclosed herein, both as to their organization and method of operation, together with associated advantages, will be better understood from the following description when considered in connection with the accompanying figures. Each of the figures is provided for the purpose of illustration and description only and not as a definition of the limits of the claims.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

The term "globally unique attribute" may refer to an attribute, value, identifier or marker that is unique globally, in the sense that reference to a globally unique attribute unambiguously refers to only one entity in the entire world. Examples of globally unique attributes may include IP addresses for devices configured to access the Internet, Vehicle Identification Numbers (VINs) for vehicles, international telephone numbers and cell Identity (CID) values for terrestrial base stations.

The term "locally unique attribute" may refer to an attribute, value, identifier or marker that is unique locally, in the sense that there may be duplicates of the same locally unique attribute and thus reference to a locally unique attribute may identify only a local entity without ambiguity. Examples of a locally unique attribute may include street addresses, student ID numbers, city names, cell parameter IDs (CPIDs), midamble indices and primary frequency values of terrestrial base stations.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Time Division Synchronous Code Division Multiple Access (TD-SCDMA), Universal Terrestrial Radio Access (UTRA), CDMA2000, etc. UTRA includes Wideband-CDMA (W-CDMA) and Low Chip Rate (LCR). CDMA2000 covers IS-2000, IS-95 and IS-856 standards. A TDMA network may implement a radio technology such as Global System for Mobile Communications (GSM). An FDMA network may include Universal Mobile Telecommunications System-frequency-division duplexing (UMTS-FDD) and the like. An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is a release of UMTS that uses E-UTRA. UTRA, E-UTRA, GSM, UMTS and LTE are described in documents from an organization named "3rd Generation Partnership Project" (3GPP). CDMA2000 is described in documents from an organization named "3rd Generation Partnership Project 2" (3GPP2). These various radio technologies and standards are known in the art.

Various embodiments are described herein in connection with an access point. An access point can also be called a system, subscriber unit, subscriber station, mobile station, mobile, remote station, remote terminal, mobile device, user terminal, terminal, wireless communication device, user agent, user device, or user equipment (UE). An access point can be a cellular telephone, a cordless telephone, a Session Initiation Protocol (SIP) phone, a wireless local loop (WLL) station, a personal digital assistant (PDA), a handheld device having wireless connection capability, Wi-Fi access point, computing device, or other processing device connected to a wireless modem.

Many embodiments may be made in accordance with specific requirements. For example, customized hardware might also be used, and/or particular elements might be implemented in hardware, software (including portable software, such as applets, etc.), or both. Further, connections to other computing devices such as network input/output devices may be employed.

Techniques described herein provide a method for using near field communication (NFC) to initiate peer-to-peer Wi-Fi ranging. Wi-Fi ranging is used to determine distance and location information for devices within the network geospace. Wi-Fi ranging is also used in the process of establishing a Wi-Fi communications link between one or more devices.

P2P Wi-Fi ranging has multiple applications ranging from P2P gaming, friend finders, asset tracking, etc. Additionally, P2P Wi-Fi ranging has, but is not limited to, three different modes that may be used: (1) Wi-Fi direct; (2) ad-hoc P2P networks; and (3) an AP-STA communication wherein one of the devices functions as a "soft" AP, providing access point functionality for other STAs.

Using NFC to initiate P2P Wi-Fi ranging may simplify the complexity of discovery by exchanging information between two Wi-Fi capable devices for facilitating the communication and ranging. NFC may establish a simple method for detection and initiation of Wi-Fi communications by a well-established process wherein devices are placed in proximity for NFC ports on mobile devices to exchange information.

Initially, applications on one or both of the devices request Wi-Fi ranging. A first device initiates a near field communication with a second device. The second device then responds to establish a NFC link. The first device then sends its state information to the second device and requests a preferred mode of Wi-Fi operation. The second device may then either accept the request or reject the request for Wi-Fi operation. If Wi-Fi operation is rejected, the devices may simply continue with NFC. If Wi-Fi operation is accepted by the second device, the second device communicates a preferred mode along with state information needed for the Wi-Fi operation to the first device. Both devices then move into the same wireless channel and establish a schedule for communication. The applications requesting Wi-Fi communications are then notified that a P2P Wi-Fi communication link has been established, and the application may proceed to use the communication link.

After the P2P Wi-Fi communication link is established, Wi-Fi ranging methods and communications such as round trip time (RTT) calculations and received signal strength indicator (RSSI) information may be used to calculate a distance between the devices, and the distance information may be used by applications on the mobile devices to update game information, provide alerts, or otherwise interact with the other mobile device.

The method for using NFC to initiate P2P Wi-Fi ranging is advantageous to the user, since it allows for a low complexity discovery mechanism resulting in a faster and more secure exchange of information needed to establish the Wi-Fi operation. Since NFC functions in relatively close proximity, usually no more than a few centimeters, there is a greater probability of ensuring that the connection request is genuine and that the number of eavesdropping devices may be limited.

By way of example, a first user and a second user may wish to engage in a multiplayer mobile game wherein both the users start in the same location and then disperse after the game has started. An example of such a multiplayer mobile game may be "mobile tag," wherein one user attempts to tag the other user(s). Relative ranging between the mobile devices may be used to determine one user's proximity to the other user(s). The use of NFC in establishing the P2P Wi-Fi ranging provides a common origin of the mobile devices and avoids initial location sync problems that may arise when each mobile device is responsible for determining its location independently.

Figure 1:
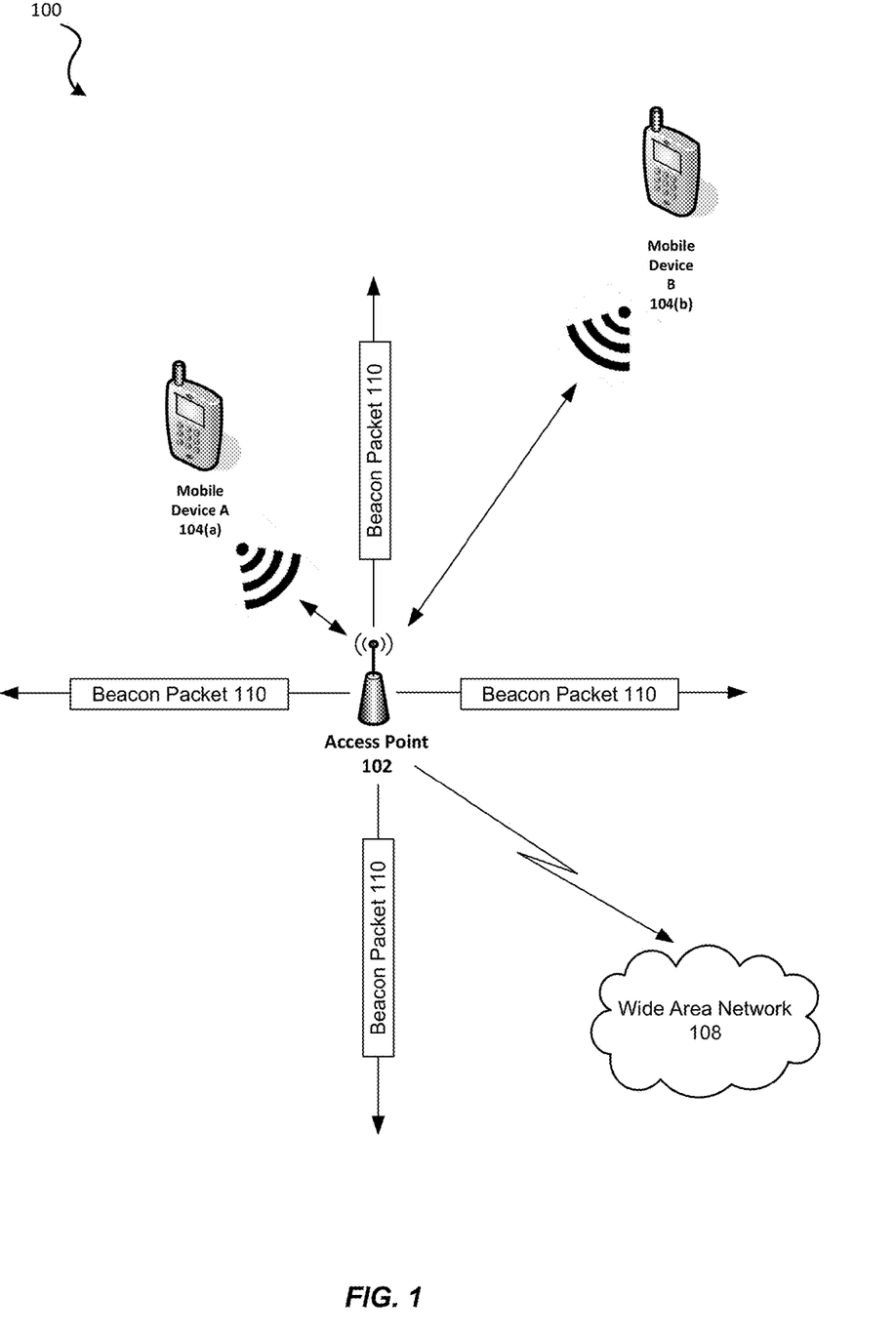
FIG. 1 is an example wireless local area network (Wi-Fi) geospace including mobile devices according to some embodiments.

FIG. 1 is an example wireless local area network (Wi-Fi) geospace 100 including mobile devices according to some embodiments. In this particular example, two mobile devices (mobile device A 104(a) and mobile device B 104(b)) wirelessly connect to a Wi-Fi access point 102. Mobile devices are small, hand-held computing devices, typically having a display screen with touch input and/or a keyboard. Mobile devices typically include, but are not limited to, portable computers, smartphones, personal digital assistants, tablet computers, calculators, handheld game consoles, portable media players, digital cameras, pagers, personal navigation devices, etc. A mobile device may also be called a station (STA).

The Wi-Fi access point 102 allows wireless devices, in this case mobile device A 104(a) and mobile device B 104(b), to wirelessly (using radio waves) connect to a network. In some embodiments, access point 102 may bridge the wireless network to a wired network, such as a router for access to a wide area network 108 (such as the Internet).

Often times, especially with mobile devices within a Wi-Fi geospace 100, ranging is used to determine locations and distances of the mobile devices from the access point 102. In most cases, this discovery process is fairly simple and straightforward. The access point 102 periodically generates beacon packets 110. The mobile devices wanting to communicate within the Wi-Fi geospace 100 listen on all available channels in order to discover any available access points within the Wi-Fi geospace 100. The mobile devices may listen on the available channels continuously or they may listen on the available channels in intervals of predetermined time periods.

However, ranging within peer-2-peer (P2P) networks, is significantly more difficult. A P2P network is one in which each device in the network can act as a client or server for the other devices in the network, allowing shared access to various resources such as files, peripherals, sensors, and applications without the need for a central server. P2P networks may be used for sharing content such as audio, video, data, or any other digital format. The discovery process involved in P2P networks is more difficult because mobile devices are migratory in nature and often times hop in and out of the wireless frequency spectrum. Furthermore, there is the potential that a mobile device may be in "sleep mode" wherein certain network capabilities of the mobile device may not be active. P2P Wi-Fi ranging is important for multiple applications. A few examples of these applications are P2P gaming, friend finders, asset tracking, etc.

Figure 2:
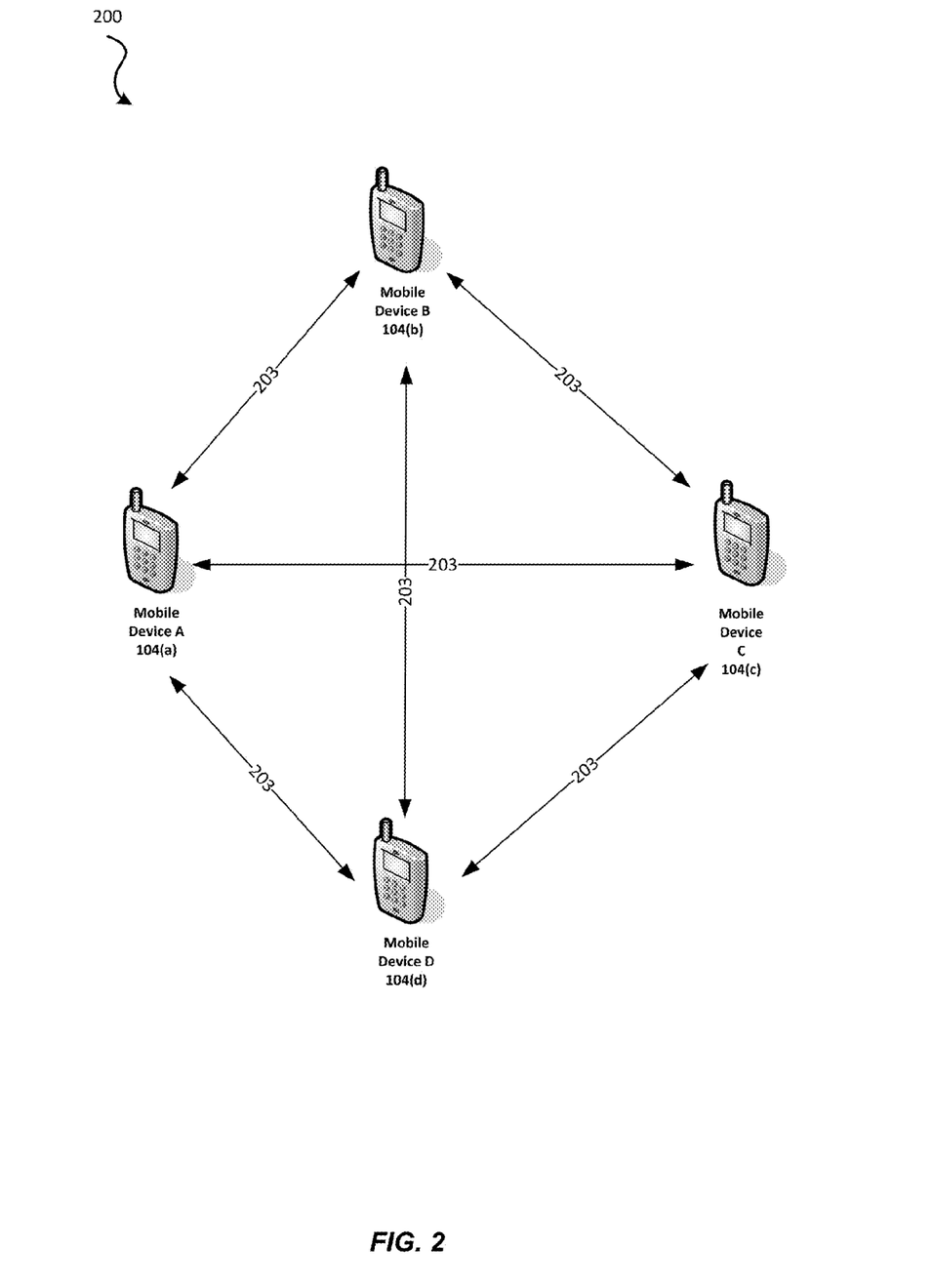
FIG. 2 is an example peer-2-peer network including mobile devices according to some embodiments.

FIG. 2 is an example P2P network 200 including mobile devices according to some embodiments. In this particular example, four mobile devices participate within the P2P network 200: mobile device A 104(a), mobile device B 104(b), mobile device C 104(c), and mobile device D 104(d). It can be appreciated that not all mobile devices need be of the same type. For example, mobile device A 104(a) may be a smartphone device while mobile device B 104(b) may be a tablet computer.

It can be appreciated that the P2P network 200 does not include an access point 102 (FIG. 1) since each mobile device is directly connected to one or more other mobile devices within the network. A P2P network 200 requires each device that wishes to participate in the network to use the same or a compatible connection protocol to connect to each other and access files and resources found on the other devices. In this particular example, the mobile devices use a Wi-Fi connection 203 to communicate with each other and access files and resources found on the other devices.

In this particular example, NFC is useful for determining locations and distances of each mobile device. For example, mobile device A 104(a) and mobile device B 104(b) may use NFC to determine whether the devices are in a close enough proximity to each other to facilitate the P2P Wi-Fi connection. The devices may also use NFC to determine each other device's media access control (MAC) addresses, their transmission power, or any other pertinent information in order to facilitate the P2P Wi-Fi connection.

Figure 3:
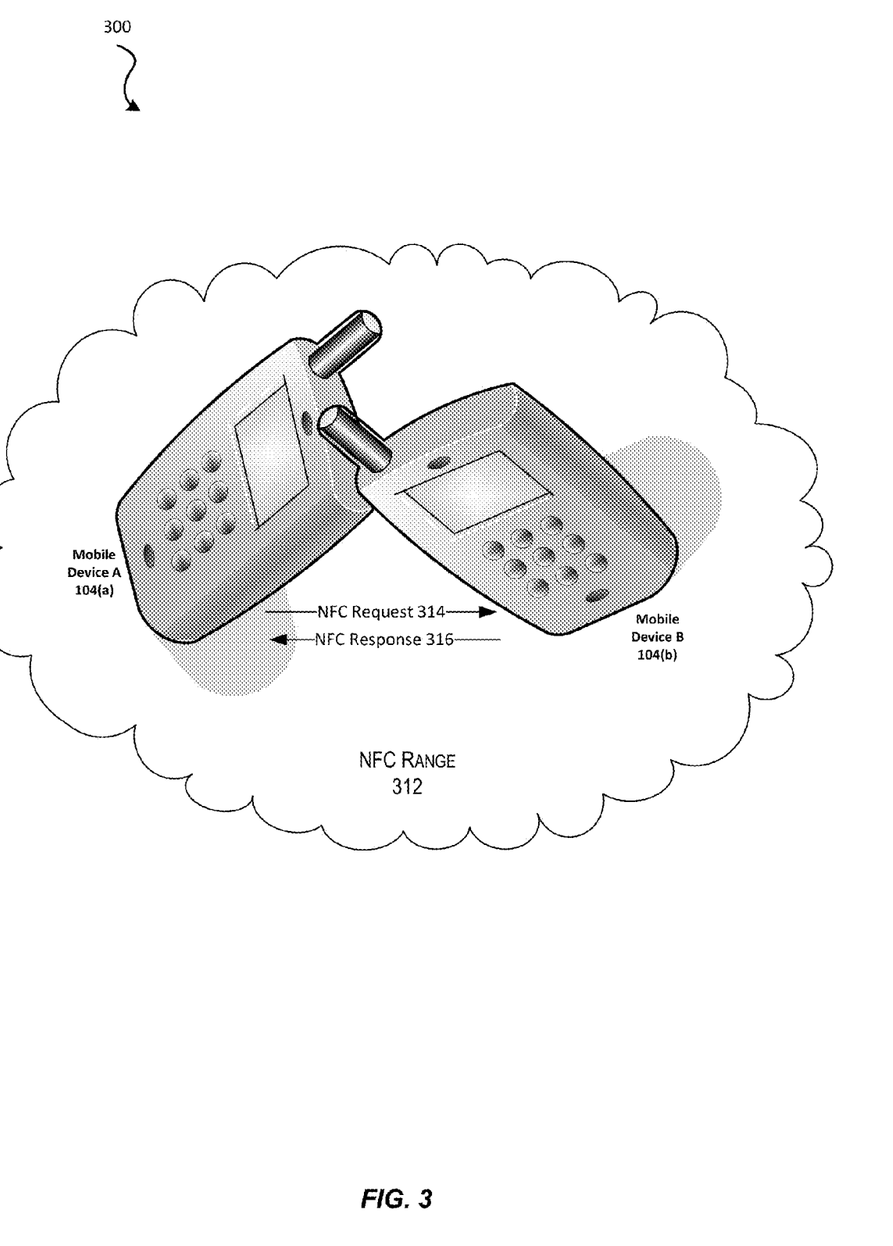
FIG. 3 is an example of establishing a near field communication (NFC) connection with mobile devices according to some embodiments.

FIG. 3 is an example of establishing a near field communication (NFC) connection 300 with mobile devices according to some embodiments. NFC is a set of standards for mobile devices and similar devices to establish radio communication with each other by touching them together or bringing them into close proximity, usually no more than a few centimeters. In some embodiments, P2P Wi-Fi ranging, a complex discovery process, may be initiated and aided with the use of NFC. In this particular example, mobile device A 104(a) and mobile device B 104(b) both include NFC ports to facilitate NFC connections. Many modern day mobile devices are equipped with NFC ports and corresponding software.

When mobile device A 104(a) and mobile device B 104(b) are brought into close proximity of each other, they are within a NFC range 312 and a NFC connection may be established. Once in close proximity of each other, mobile device A 104(a) acts as an initiator and sends a NFC request 314 to mobile device B 104(b), the target device, via a radio frequency (RF) signal. Even if mobile device B 104(b) is in "sleep mode," a NFC initiator device can actively generate a RF field that can power mobile device B 104(b) and cause it to wake up from "sleep mode."

As mentioned above, by first establishing a simple NFC connection, the complex discovery process for P2P Wi-Fi ranging is simplified by exchanging information between the two Wi-Fi capable devices to facilitate communication and ranging. The use of NFC may establish a simple method for the detection and initiation of Wi-Fi communication.

Figure 4:
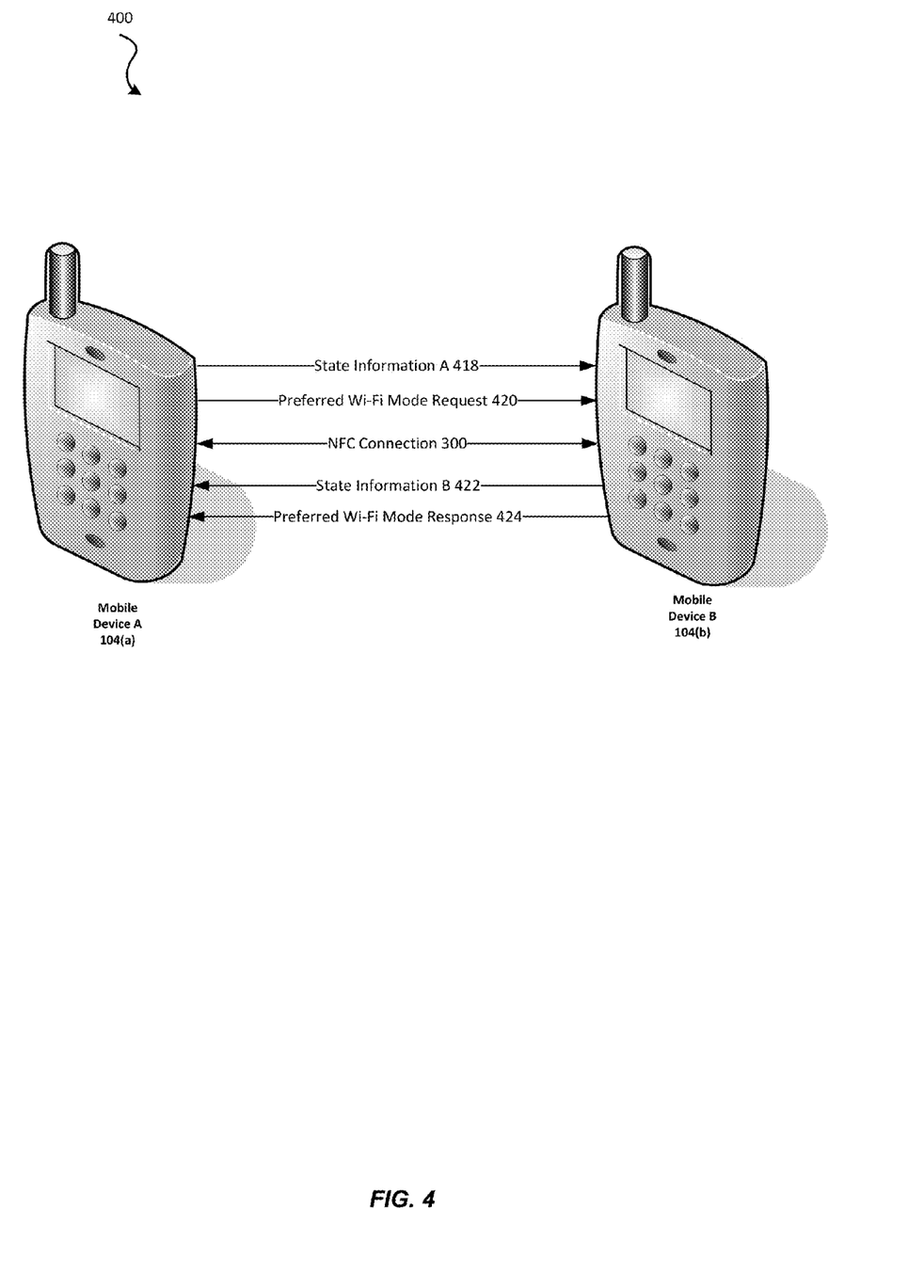
FIG. 4 is an example showing information exchanged in initiating peer-2-peer Wi-Fi ranging using NFC according to some embodiments.

FIG. 4 is an example showing information exchanged in initiating peer-2-peer Wi-Fi ranging using NFC 400 according to some embodiments. For purposes of this illustration, mobile device A 104(a) and mobile device B 104(b) are in close proximity to each other and within the NFC range 312 (FIG. 3), allowing for an NFC connection 300. Initially, an application residing on either mobile device A 104(a) or mobile device B 104(b) (or both) initiates a request for Wi-Fi ranging. For purposes of this illustration, mobile device A 104(a) initiates the request for Wi-Fi ranging. Mobile device A 104(a) requests to create a NFC connection 300 with mobile device B 104(b) and mobile device B 104(b) responds to establish the NFC connection 300. Mobile device A 104(a) may then send state information A 418 and a request for the preferred Wi-Fi mode 420 to mobile device B 104(b). In some embodiments, mobile device A 104(a) may send state information A 418 and the preferred Wi-Fi mode 420 to mobile device B 104(b).

State information A 418 may include mobile device A's 104(a) MAC addresses, its transmission power, or any other pertinent information in order to facilitate the P2P Wi-Fi connection. The request for the preferred Wi-Fi mode to mobile device B 104(b) is made to determine which of the following Wi-Fi modes to use in establishing the P2P Wi-Fi connection: (1) Wi-Fi direct; (2) ad-hoc P2P networks; and (3) an AP-STA communication wherein one of the devices functions as a "soft" AP, providing access point functionality for other STAs.

Mobile device B 104(b) may either accept or reject the request for Wi-Fi ranging. Accepting or rejecting the request may be based on a number of factors, including battery life remaining, device security, etc. It can be appreciated that if mobile device B 104(b) rejects the request for Wi-Fi ranging, the NFC connection 300 may still continue. If mobile device B 104(b) accepts the request for Wi-Fi ranging, mobile device B 104(b) may respond with state information B 422 and a response to the preferred Wi-Fi mode request 424. Similar to state information A 418, State information B 422 may include mobile device B's 104(b) MAC addresses, its transmission power, or any other pertinent information in order to facilitate the P2P Wi-Fi connection. In some embodiments, mobile device B 104(b) may simply accept the mobile device A's 104(a) preferred Wi-Fi mode 420 without replying with a preferred Wi-Fi mode response 424.

Upon completion of exchanging the relevant information to facilitate the P2P Wi-Fi ranging request, mobile device A 104(a) and mobile device B 104(b) move into the same wireless channel and establish a schedule for communication. The application on mobile device A 104(a) requesting the Wi-Fi ranging is notified that a P2P Wi-Fi connection has been established and that the application may proceed to make use of the established connection.

The process detailed above may vary slightly for the three different Wi-Fi communication methods listed above. It can be appreciated that there may be other Wi-Fi communication methods other than the ones mentioned in the present disclosure. In the case of Wi-Fi direct, a peer discovery process exists that is instantiated by one of the mobile devices. Without NFC, this mechanism may operate with a local list of Wi-Fi direct enabled devices in the vicinity from which the instantiating device has to select. However, this discovery and selection process may be replaced using NFC. When the devices are brought in contact for NFC, Wi-Fi details may be shared directly. The NFC process enables a P2P Wi-Fi connection wherein one device is the server and the other device is the client. After initiation, both devices are free to move about and communicate using the Wi-Fi connection. The devices need not remain within the NFC range 312 (FIG. 3).

The process is similar in the case of an ad-hoc P2P Wi-Fi network, except that the devices within the network do not rely on a preexisting infrastructure.

In the case of an AP-STA communication wherein one of the devices functions as a "soft" AP, one device typically starts in AP mode, wherein other STAs scan channels to discover that the AP with a certain MAC address and service set identification (SSID) exist, at which point the STA then connects to the soft-AP. This process further requires configuration of credentials such as private keys. However, NFC communication can function to simply identify the appropriate soft-AP, enable credential exchange, and improve security by limiting the potential of eavesdropping devices to intercept credentials.

After the P2P Wi-Fi connection link is established, Wi-Fi ranging methods and communications such as round trip time (RTT) calculations and received signal strength indicator (RSSI) information may be used to calculate a distance between the devices, and the distance information may be used by applications on the mobile devices to update game information, provide alerts, or otherwise interact with the other mobile device. In additional embodiments, a NFC connection between one of the devices may then use a NFC with a third, fourth, or any number of devices to share Wi-Fi connection information via NFC to enable the additional devices to join the P2P Wi-Fi network.

Figure 5:
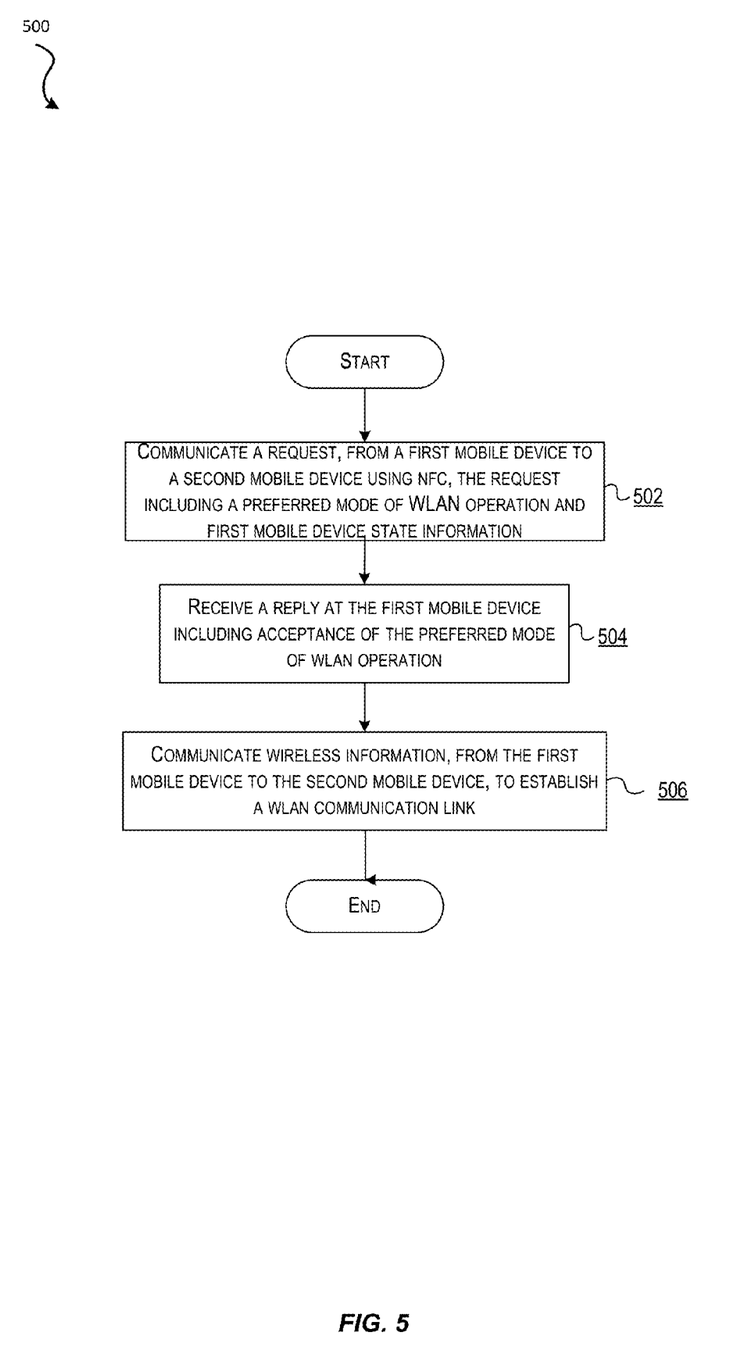
FIG. 5 is an exemplary flowchart of a method for using NFC to initiate a peer-2-peer Wi-Fi ranging according to some embodiments.

FIG. 5 is an exemplary flowchart 500 of a method for using NFC to initiate a peer-2-peer Wi-Fi ranging according to some embodiments. In block 502, a request is communicated, from a first mobile device to a second mobile device, including a preferred mode of Wi-Fi operation and first mobile device state information. The first mobile device state information may include the mobile device's MAC addresses, its transmission power, or any other pertinent information in order to facilitate the P2P Wi-Fi connection. The preferred mode of Wi-Fi operation may be either, but is not limited to: (1) Wi-Fi direct; (2) ad-hoc P2P networks; and (3) an AP-STA communication wherein one of the devices functions as a "soft" AP, providing access point functionality for other STAs. For example, in FIG. 4, mobile device A sends its state information and a preferred Wi-Fi mode request to mobile device B.

In block 504, a reply is received at the first mobile device including acceptance of the preferred mode of Wi-Fi operation. In some embodiments, a reply is received at the first mobile device including the preferred mode of Wi-Fi operation and second mobile device state information. Similar to the first mobile device, the second mobile device state information may include the mobile device's MAC addresses, its transmission power, or any other pertinent information in order to facilitate the P2P Wi-Fi connection. The preferred mode of Wi-Fi operation may be, but is not limited to, one of the Wi-Fi operation modes listed above. For example, in FIG. 4, mobile device B sends its state information and a response to the preferred Wi-Fi mode request to mobile device A.

In block 506, wireless information is communicated, from the first mobile device to the second mobile device, to establish a Wi-Fi communication link. For example, in FIG. 4, wireless information is communicated from mobile device A to mobile device B using the status information sent by mobile device B to establish a Wi-Fi communication link. In some embodiments, the wireless information may be communicated via NFC.

In block 508, the Wi-Fi communication link is established between the first mobile device and the second mobile device. For example, in FIG. 4, a Wi-Fi communication link is established between mobile device A and mobile device B. The Wi-Fi communication link is established based on the wireless information communicated via the NFC connection.

In some embodiments, the Wi-Fi ranging may be used to determine distance and location information for the mobile devices. The method may further include communicating, from the first mobile device to the second mobile device, a round trip time (RTT) information and a received signal strength indicator (RSSI) information, and calculating a distance from the first mobile device to the second mobile device based on the RTT information and the RSSI information.

Figure 6:
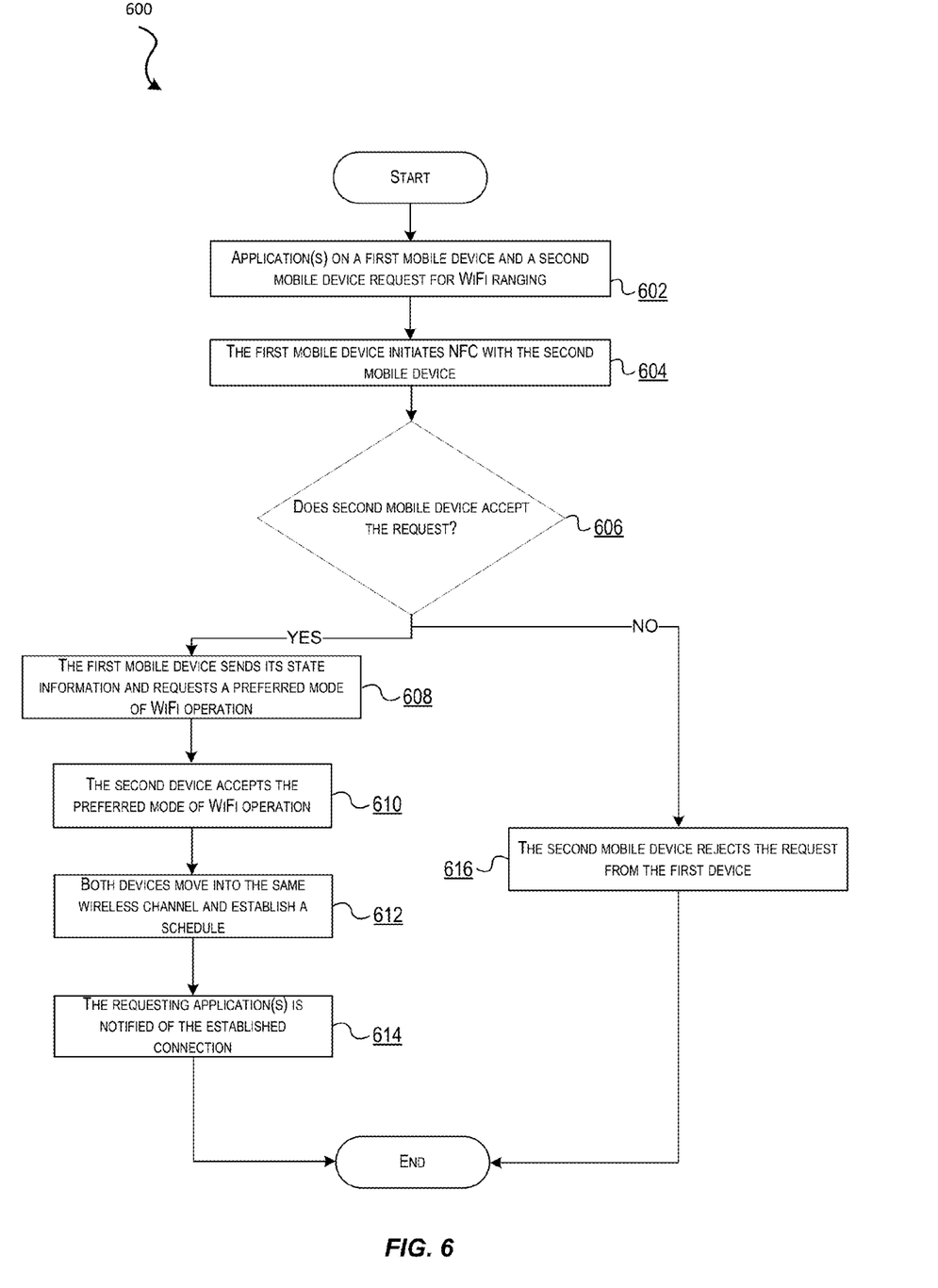
FIG. 6 is an exemplary flowchart of a method for establishing a peer-2-peer Wi-Fi communication using NFC according to some embodiments.

FIG. 6 is an exemplary flowchart 600 of a method for establishing a P2P Wi-Fi communication using NFC according to some embodiments. In block 602, an application(s) on a first mobile device and a second mobile device request for Wi-Fi ranging. It can be appreciated that the respective application on each mobile device may initiate the request individually or both applications may initiate the request simultaneously. The application(s) may be a gaming application, mobile payment application, data exchange application, chat application, or any other application that can make use of the P2P Wi-Fi communication.

In block 604, the first mobile device initiates a NFC connection with the second mobile device. When both devices are within close proximity of each other, a NFC range may be established and the devices may use NFC to communicate pertinent information for Wi-Fi ranging. In block 606, the second mobile device may elect to either accept or reject the request. Accepting or rejecting the request may be based on a number of factors, including battery life remaining, device security, etc. It can be appreciated that if the second mobile device rejects the request for Wi-Fi ranging, block 616, the NFC connection may still continue. However, information pertaining to Wi-Fi ranging will not be exchanged and a Wi-Fi communication may not be established. For example, in FIG. 4, mobile device B may either accept or reject the NFC connection from mobile device A.

In block 608, if the second mobile device accepts the request for Wi-Fi ranging, the first mobile device may send its state information and request a preferred mode of Wi-Fi operation. The first mobile device state information may include the mobile device's MAC addresses, its transmission power, or any other pertinent information in order to facilitate the P2P Wi-Fi connection. The preferred mode of Wi-Fi operation may be either, but is not limited to: (1) Wi-Fi direct; (2) ad-hoc P2P networks; and (3) an AP-STA communication wherein one of the devices functions as a "soft" AP, providing access point functionality for other STAs. For example, in FIG. 4, mobile device A sends its state information and a preferred Wi-Fi mode request to mobile device B.

In block 610, the second mobile device may respond with an acceptance of the preferred mode of Wi-Fi operation. In some embodiments, the second mobile device may respond with state information and a response to the preferred Wi-Fi mode request. Similar to the first mobile device, the second mobile device state information may include the mobile device's MAC addresses, its transmission power, or any other pertinent information in order to facilitate the P2P Wi-Fi connection. The preferred mode of Wi-Fi operation may be, but is not limited to, one of the Wi-Fi operation modes listed above. For example, in FIG. 4, mobile device B sends its state information and a response to the preferred Wi-Fi mode request to mobile device A.

In block 612, both devices move into the same wireless channel and establish a schedule. For example, in FIG. 4, upon completion of exchanging the relevant information to facilitate the P2P Wi-Fi ranging request, mobile device A and mobile device B move into the same wireless channel and establish a schedule for communication.

In some embodiments, the Wi-Fi ranging may be used to determine distance and location information for the mobile devices. The method may further include communicating, from the first mobile device to the second mobile device, a round trip time (RTT) information and a received signal strength indicator (RSSI) information, and calculating a distance from the first mobile device to the second mobile device based on the RTT information and the RSSI information.

In block 614, the requesting application(s) is notified of the established Wi-Fi connection. For example, in FIG. 4, the application on mobile device A requesting the Wi-Fi ranging is notified that a P2P Wi-Fi connection has been established and that the application may proceed to make use of the established connection. In some embodiments, when the application is a gaming application, a state of the first application is updated using the distance from the first mobile device to the second mobile device obtained based on the RTT information and the RSSI information.

Figure 7:
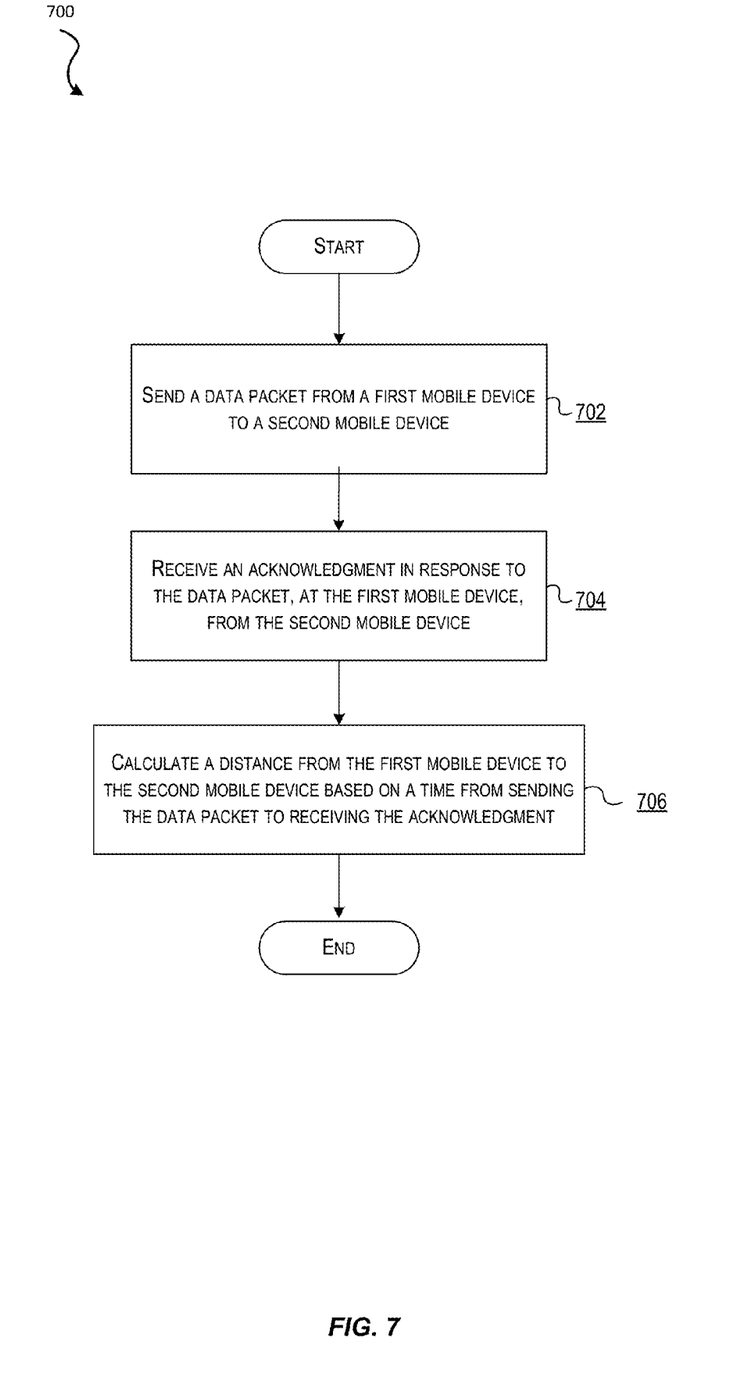
FIG. 7 is an exemplary flowchart of a method for calculating a distance between devices using round trip time according to some embodiments.

FIG. 7 is an exemplary flowchart 700 of a method for calculating a distance between devices using round trip time (RTT) according to some embodiments. RTT is the length of time it takes for a signal to be sent plus the length of time it takes for an acknowledgment of that signal to be received. This time delay therefore consists of the transmission times between the two points of a signal. RTT may also be known as ping time. In block 702, a data packet is sent from a first mobile device to a second mobile device. The data packet may be any arbitrary data packet generated for the purpose of determining the RTT. For example, in FIG. 4, mobile device A communicates a RTT information to mobile device B for the purpose of Wi-Fi ranging.

In block 704, an acknowledgment is received in response to the data packet, at the first mobile device, from the second mobile device. For example, in FIG. 4, the second mobile device sends an acknowledgment in response to the RTT data packet to the first mobile device.

In block 706, a distance is calculated from the first mobile device to the second mobile device based on a time from sending the data packet to receiving the acknowledgment. For example, in FIG. 4, the distance between the first mobile device and the second mobile device is calculated based on the RTT information time and the corresponding result is used for Wi-Fi ranging. In some embodiments, the distance from the first mobile device to the second mobile device may be calculated based on a received signal strength indicator (RSSI) information. In some embodiments, the distance from the first mobile device to the second mobile device may be calculated based on a combination of the RTT information and RSSI information.

Figure 8:
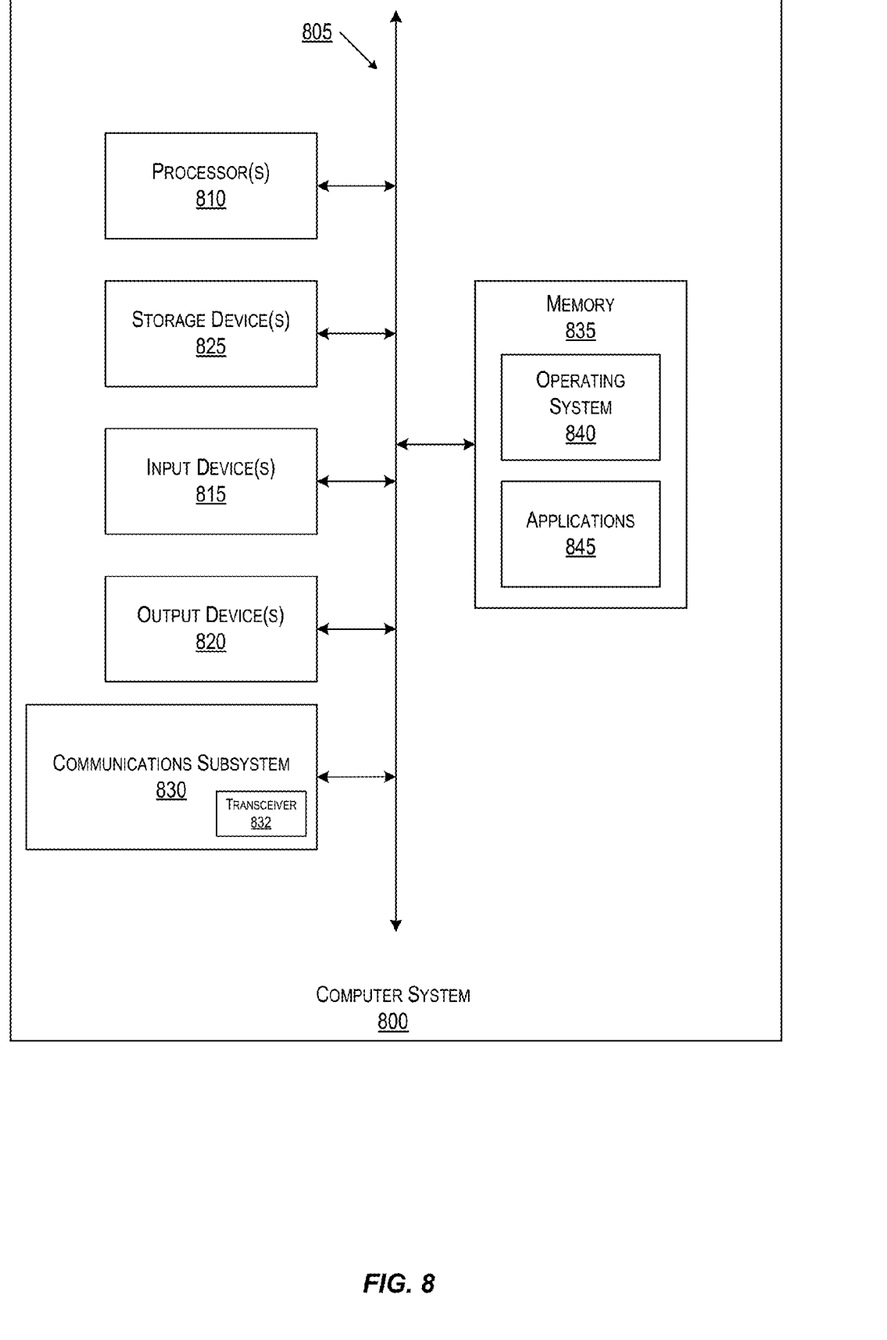
FIG. 8 is an example computer system according to some embodiments.

Having described multiple aspects of improving P2P Wi-Fi ranging by using NFC, an example of a computing system in which various aspects of the disclosure may be implemented will now be described with respect to FIG. 8. According to one or more aspects, a computer system as illustrated in FIG. 8 may be incorporated as part of a computing device, which may implement, perform, and/or execute any and/or all of the features, methods, and/or method steps described herein. For example, computer system 800 may represent some of the components of a hand-held device. A hand-held device may be any computing device with an input sensory unit, such as a wireless receiver or modem. Examples of a hand-held device include but are not limited to video game consoles, tablets, smart phones, televisions, and mobile devices or mobile stations. In some embodiments, the system 800 is configured to implement any of the methods described above. FIG. 8 provides a schematic illustration of one embodiment of a computer system 800 that can perform the methods provided by various other embodiments, as described herein, and/or can function as the host computer system, a remote kiosk/terminal, a point-of-sale device, a mobile device, a set-top box, and/or a computer device. FIG. 8 is meant only to provide a generalized illustration of various components, any and/or all of which may be utilized as appropriate. FIG. 8, therefore, broadly illustrates how individual system elements may be implemented in a relatively separated or relatively more integrated manner.

The computer system 800 is shown comprising hardware elements that can be electrically coupled via a bus 805 (or may otherwise be in communication, as appropriate). The hardware elements may include one or more processors 810, including without limitation one or more general-purpose processors and/or one or more special-purpose processors (such as digital signal processing chips, graphics acceleration processors, and/or the like); one or more input devices 815, which can include without limitation a camera, wireless receivers, wireless sensors, a mouse, a keyboard and/or the like; and one or more output devices 820, which can include without limitation a display unit, a printer and/or the like. In some embodiments, the one or more processor 810 may be configured to perform a subset or all of the functions described above with respect to FIG. 5 through FIG. 7. The processor 810 may comprise a general processor and/or and application processor, for example. In some embodiments, the processor is integrated into an element that processes visual tracking device inputs and wireless sensor inputs.

The computer system 800 may further include (and/or be in communication with) one or more non-transitory storage devices 825, which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data storage, including without limitation, various file systems, database structures, and/or the like.

The computer system 800 might also include a communications subsystem 860, which can include without limitation a modem, a network card (wireless or wired), an infrared communication device, a wireless communication device and/or chipset (such as a Bluetooth® device, an 802.11 device, a Wi-Fi device, a WiMax device, cellular communication facilities, etc.), and/or the like. The communications subsystem 830 may permit data to be exchanged with a network (such as the network described below, to name one example), other computer systems, and/or any other devices described herein. In many embodiments, the computer system 800 will further comprise a non-transitory working memory 835, which can include a RAM or ROM device, as described above. The communications subsystem may also include a transceiver 832 configured for data transmission.

The computer system 800 also can comprise software elements, shown as being currently located within the working memory 835, including an operating system 840, device drivers, executable libraries, and/or other code, such as one or more application programs 845, which may comprise computer programs provided by various embodiments, and/or may be designed to implement methods, and/or configure systems, provided by other embodiments, as described herein. Merely by way of example, one or more procedures described with respect to the method(s) discussed above, for example as described with respect to FIG. 5 through FIG. 7, might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a computer-readable storage medium, such as the storage device(s) 825 described above. In some cases, the storage medium might be incorporated within a computer system, such as computer system 800. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the computer system 800 and/or might take the form of source and/or installable code, which, upon compilation and/or installation on the computer system 800 (e.g., using any of a variety of generally available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

Some embodiments may employ a computer system (such as the computer system 800) to perform methods in accordance with the disclosure. For example, some or all of the procedures of the described methods may be performed by the computer system 800 in response to processor 810 executing one or more sequences of one or more instructions (which might be incorporated into the operating system 840 and/or other code, such as an application program 845) contained in the working memory 835. Such instructions may be read into the working memory 835 from another computer-readable medium, such as one or more of the storage device(s) 825. Merely by way of example, execution of the sequences of instructions contained in the working memory 835 might cause the processor(s) 810 to perform one or more procedures of the methods described herein, for example methods described with respect to FIG. 5 through FIG. 7.

The terms "machine-readable medium" and "computer-readable medium," as used herein, refer to any medium that participates in providing data that causes a machine to operate in a specific fashion. In an embodiment implemented using the computer system 800, various computer-readable media might be involved in providing instructions/code to processor(s) 810 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media include, for example, optical and/or magnetic disks, such as the storage device(s) 825. Volatile media include, without limitation, dynamic memory, such as the working memory 835. Transmission media include, without limitation, coaxial cables, copper wire and fiber optics, including the wires that comprise the bus 805, as well as the various components of the communications subsystem 830 (and/or the media by which the communications subsystem 830 provides communication with other devices). Hence, transmission media can also take the form of waves (including without limitation radio, acoustic and/or light waves, such as those generated during radio-wave and infrared data communications).

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, a carrier wave as described hereinafter, or any other medium from which a computer can read instructions and/or code.

Various forms of computer-readable media may be involved in carrying one or more sequences of one or more instructions to the processor(s) 810 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 800. These signals, which might be in the form of electromagnetic signals, acoustic signals, optical signals and/or the like, are all examples of carrier waves on which instructions can be encoded, in accordance with various embodiments.

The communications subsystem 830 (and/or components thereof) generally will receive the signals, and the bus 805 then might carry the signals (and/or the data, instructions, etc. carried by the signals) to the working memory 835, from which the processor(s) 810 retrieves and executes the instructions. The instructions received by the working memory 835 may optionally be stored on a non-transitory storage device 825 either before or after execution by the processor(s) 810. Memory 835 may contain at least one database according to any of the databases and methods described herein. Memory 835 may thus store any of the values discussed in any of the present disclosures, including FIG. 5 through FIG. 7 and related descriptions.

The methods described in FIG. 5 through FIG. 7 may be implemented by various blocks in FIG. 8. For example, processor 810 may be configured to perform any of the functions of blocks in diagrams 500, 600, and 700. Storage device 825 may be configured to store an intermediate result, such as a globally unique attribute or locally unique attribute discussed within any of blocks mentioned herein. Storage device 825 may also contain a database consistent with any of the present disclosures. The memory 835 may similarly be configured to record signals, representation of signals, or database values necessary to perform any of the functions described in any of the blocks mentioned herein. Results that may need to be stored in a temporary or volatile memory, such as RAM, may also be included in memory 835, and may include any intermediate result similar to what may be stored in storage device 825. Input device 815 may be configured to receive wireless signals from satellites and/or base stations according to the present disclosures described herein. Output device 820 may be configured to display images, print text, transmit signals and/or output other data according to any of the present disclosures.

The methods, systems, and devices discussed above are examples. Various embodiments may omit, substitute, or add various procedures or components as appropriate. For instance, in alternative configurations, the methods described may be performed in an order different from that described, and/or various stages may be added, omitted, and/or combined. Also, features described with respect to certain embodiments may be combined in various other embodiments. Different aspects and elements of the embodiments may be combined in a similar manner. Also, technology evolves and, thus, many of the elements are examples that do not limit the scope of the disclosure to those specific examples.

Specific details are given in the description to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of the embodiments. Rather, the preceding description of the embodiments will provide those skilled in the art with an enabling description for implementing embodiments of the invention. Various changes may be made in the function and arrangement of elements without departing from the spirit and scope of the invention.

Also, some embodiments were described as processes depicted as flow diagrams or block diagrams. Although each may describe the operations as a sequential process, many of the operations can be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks.

Having described several embodiments, various modifications, alternative constructions, and equivalents may be used without departing from the spirit of the disclosure. For example, the above elements may merely be a component of a larger system, wherein other rules may take precedence over or otherwise modify the application of the invention. Also, a number of steps may be undertaken before, during, or after the above elements are considered. Accordingly, the above description does not limit the scope of the disclosure.

Various examples have been described. These and other examples are within the scope of the following claims.

What is claimed is:

1. A method comprising:
communicating, from a first device to a second device using near field communication (NFC), a request comprising a wireless local area network (Wi-Fi) ranging operation and first device state information;
receiving, at the first device from the second device, a reply comprising acceptance of the Wi-Fi ranging operation;
communicating, from the first device to the second device, wireless information to enable the Wi-Fi ranging operation between the first device and the second device.

2. The method of claim 1 further comprising:
communicating, from the first device to the second device, at least one of a round trip time (RTT) information and a received signal strength indicator (RSSI) information; and
calculating a distance from the first device to the second device based on the RTT information and the RSSI information.

3. The method of claim 2 further comprising:
initiating, from a first application on the first device, the request; and
updating a state of the first application using the distance from the first device to the second device.

4. The method of claim 1 wherein the reply further comprises second device state information.

5. The method of claim 1 wherein the Wi-Fi communication link is a Wi-Fi direct communication link or an ad-hoc Wi-Fi communication link.

6. The method of claim 1 wherein the Wi-Fi communication link is a soft access point communication link wherein the second device functions as an access point.

7. The method of claim 1 wherein the first device state information comprises a media access control (MAC) address or a transmission power.

8. An apparatus comprising:
a processor;
a transceiver coupled to the processor, the transceiver being configured to:
communicate, from a first device to a second device using near field communication (NFC), a request comprising a wireless local area network (Wi-Fi) ranging operation and first device state information;
receive, at the first device from the second device, a reply comprising acceptance of the Wi-Fi ranging operation;
communicate, from the first device to the second device, wireless information to enable the Wi-Fi ranging operation between the first device and the second device.

9. The apparatus of claim 8, wherein:
the transceiver is further configured to communicate, from the first device to the second device, at least one of a round trip time (RTT) information and a received signal strength indicator (RSSI) information; and
the processor is configured to calculate a distance from the first device to the second device based on the RTT information and the RSSI information.

10. The apparatus of claim 9, wherein the processor is further configured to:
initiate, from a first application on the first device, the request; and
update a state of the first application using the distance from the first device to the second device.

11. The apparatus of claim 8 wherein the reply further comprises second device state information.

12. The apparatus of claim 8 wherein the Wi-Fi communication link is a Wi-Fi direct communication link or an ad-hoc Wi-Fi communication link.

13. The apparatus of claim 8 wherein the Wi-Fi communication link is a soft access point communication link wherein the second device functions as an access point.

14. The apparatus of claim 8 wherein the first device state information comprises a media access control (MAC) address or a transmission power.

15. An apparatus comprising:
means for communicating, from a first device to a second device using near field communication (NFC), a request comprising a wireless local area network (Wi-Fi) ranging operation and first device state information;
means for receiving, at the first device from the second device, a reply comprising acceptance of the Wi-Fi ranging operation;
means for communicating, from the first device to the second device, wireless information to enable the Wi-Fi ranging operation between the first device and the second device.

16. The apparatus of claim 15 further comprising:
means for communicating, from the first device to the second device, at least one of a round trip time (RTT) information and a received signal strength indicator (RSSI) information; and
means for calculating a distance from the first device to the second device based on the RTT information and the RSSI information.

17. The apparatus of claim 16 further comprising:
means for initiating, from a first application on the first device, the request; and
means for updating a state of the first application using the distance from the first device to the second device.

18. The apparatus of claim 15 wherein the reply further comprises second device state information.

19. The apparatus of claim 15 wherein the Wi-Fi communication link is a Wi-Fi direct communication link or an ad-hoc Wi-Fi communication link.

20. The apparatus of claim 15 wherein the Wi-Fi communication link is a soft access point communication link wherein the second device functions as an access point.

21. The apparatus of claim 15 wherein the first device state information comprises a media access control (MAC) address or a transmission power.

22. A non-transitory computer program product residing on a processor-readable medium and comprising processor-readable instructions configured to cause a processor to:
communicate, from a first device to a second device using near field communication (NFC), a request comprising a wireless local area network (Wi-Fi) ranging operation and first device state information;
receive, at the first device from the second device, a reply comprising acceptance of the Wi-Fi ranging operation;
communicate, from the first device to the second device, wireless information to enable the Wi-Fi ranging operation between the first device and the second device.

23. The non-transitory computer program product of claim 22, wherein the instructions further cause the processor to:
communicate, from the first device to the second device, at least one of a round trip time (RTT) information and a received signal strength indicator (RSSI) information; and
calculate a distance from the first device to the second device based on the RTT information and the RSSI information.

24. The non-transitory computer program product of claim 23, wherein the instructions further cause the processor to:
initiate, from a first application on the first device, the request; and
update a state of the first application using the distance from the first device to the second device.

25. The non-transitory computer program product of claim 22 wherein the reply further comprises second device state information.

26. The non-transitory computer program product of claim 22 wherein the Wi-Fi communication link is a Wi-Fi direct communication link or an ad-hoc Wi-Fi communication link.

27. The non-transitory computer program product of claim 22 wherein the Wi-Fi communication link is a soft access point communication link wherein the second device functions as an access point.

28. The non-transitory computer program product of claim 22 wherein the first device state information comprises a media access control (MAC) address or a transmission power.

* * * * *